United States Patent
Engler et al.

(10) Patent No.: US 7,363,863 B2
(45) Date of Patent: Apr. 29, 2008

(54) GAS GENERATOR

(75) Inventors: Henri Engler, Rostock (DE); Karl Englbrecht, Erharting (DE); Andreas Zauhar, Burghausen (DE); Thomas Kapfelsperger, Mühldorf (DE); Andreas Schachtner, Wurmannsquick (DE)

(73) Assignee: TRW Airbag Systems GmbH, Aschau am Inn (DE)

( * ) Notice: Subject to any disclaimer, the term of this patent is extended or adjusted under 35 U.S.C. 154(b) by 407 days.

(21) Appl. No.: 10/992,905

(22) Filed: Nov. 19, 2004

(65) Prior Publication Data
US 2005/0110254 A1    May 26, 2005

(30) Foreign Application Priority Data
Nov. 26, 2003   (DE) ............................ 203 18 283 U

(51) Int. Cl.
*B60R 21/26* (2006.01)
(52) U.S. Cl. ........................ 102/530; 280/741
(58) Field of Classification Search ........... 102/530, 102/531; 280/741, 736, 737, 740, 742
See application file for complete search history.

(56) References Cited

U.S. PATENT DOCUMENTS

| 4,249,673 A | | 2/1981 | Katoh et al. |
| 4,590,041 A | * | 5/1986 | Hill .............................. 422/165 |
| 5,387,008 A | * | 2/1995 | Lauritzen et al. ........... 280/741 |
| 5,589,141 A | | 12/1996 | Sides et al. |
| 6,000,718 A | * | 12/1999 | Krupp ......................... 280/736 |
| 6,120,058 A | * | 9/2000 | Mangum et al. ............ 280/741 |
| 6,168,200 B1 | | 1/2001 | Greist, III et al. |
| 6,231,079 B1 | | 5/2001 | Perotto et al. |

FOREIGN PATENT DOCUMENTS

| DE | 19528864 | 2/1997 |
| EP | 0672562 | 9/1995 |
| EP | 0825074 | 2/1998 |
| JP | 08133001 | 5/1996 |
| WO | 98/39181 | 9/1998 |

\* cited by examiner

*Primary Examiner*—James S Bergin
(74) *Attorney, Agent, or Firm*—Tarolli, Sundheim, Covell & Tummino LLP

(57) ABSTRACT

A gas generator has a combustion chamber containing a pyrotechnic propellant charge and a biasing unit biasing the propellant charge. A holding device is provided, which holds the biasing unit in a predetermined, fixed, compressed position and which is designed to be releasable, so as to selectively release the biasing unit, so that it arrives at a release position in which it exerts a biasing force on the propellant charge.

20 Claims, 1 Drawing Sheet

GAS GENERATOR

TECHNICAL FIELD

The present invention relates to a gas generator.

BACKGROUND OF THE INVENTION

The propellant charge accommodated in a gas generator for vehicle occupant restraint systems is mechanically biased so that during the years of driving operation it cannot move. This is especially important with a tablet-charge filling, because the tablets would rub against each other and would wear away. The biasing units used heretofore have been, by way of example, springs or foam inserts. A pyrotechnic gas generator is usually closed by welding, it being important in the process to prevent the pyrotechnic propellant charge from igniting during the welding as a result of a spark.

BRIEF DESCRIPTION OF THE INVENTION

It is an object of the present invention to provide a gas generator which is easy to fill and whose individual parts can be welded to each other in a simple manner.

To achieve this object, a gas generator comprises a combustion chamber containing a pyrotechnic propellant charge and a biasing unit biasing the propellant charge. A holding device is provided, which holds the biasing unit in a predetermined, fixed, compressed position and which is designed to be releasable, so as to selectively release the biasing unit, so that it arrives at a release position in which it exerts a biasing force on the propellant charge.

The biasing units customary heretofore, e.g., springs, were usually inserted into the combustion chamber first, and then the propellant charge was pressed into the combustion chamber through the application of external force, so that the spring became compressed. Still other systems provided that the combustion chamber, open on one side, is closed by a cover after the filling of the propellant charge, the biasing unit being positioned on the interior side of the cover.

In contrast, the present invention provides that the biasing unit, as the gas generator is filled, is kept in a compressed position by the holding device, without its exerting the biasing force on the propellant charge in this context. In this position, the biasing unit is more compressed than in the subsequent release position. Only in the release position the biasing unit exerts the biasing force on the propellant charge and a non-fixed position results, which is determined by an equilibrium of forces between the biasing unit and the opposing pressure of the propellant charge. Due to the fixed, compressed position, the propellant charge can be filled without pressure having to be exerted on the propellant charge during the filling process and during the subsequent closing process of the combustion chamber. In addition, the compressed position makes it possible to not completely fill the combustion chamber with propellant charge before it is closed, so that, when the combustion chamber is closed, specifically by welding, the propellant charge can be at a sufficient distance from this joining location. Thus, there is no danger of igniting the propellant charge when the gas generator or the combustion chamber are closed. Only after the closing can the holding device be released, as a result of which the biasing unit arrives in the release position.

According to the preferred embodiment, the holding device is a mechanical locking means, which engages, for example, the combustion chamber wall, the exterior housing of the gas generator, or, according to the preferred embodiment, another section of the holding device, so that in the latter case the holding device forms a self-contained unit, which in the compressed position maintains itself in a stable state.

The biasing unit should be a preassembled unit, which can be inserted into the combustion chamber as such, already in the compressed position, thus making the assembly process easier.

The biasing unit has, e.g., a front wall facing the propellant charge, a rear wall facing away from the propellant charge, as well as an elastic spring element between them, and is thus designed so as to have very few parts.

The front wall and the rear wall are alternatively joined to each other by the holding device firmly and at a constant distance in the compressed position, and they are uncoupled from each other in the release position. "Uncoupled" means that the front and rear walls are released from each other such that the front wall can move freely towards the propellant charge.

The holding device includes, for example, extensions protruding from the front wall, which engage, e.g., the rear wall. Of course, inversely, the rear wall could also carry the extensions, which would engage the front wall.

In order to grant a simple and rapid release, it is preferably provided that the holding device has a turning lock, in particular a bayonet lock, and that it attains the release position by turning the lock.

The combustion chamber is delimited on the exterior side by a combustion chamber wall, the biasing unit being located at an axial end of the preferably elongated, cylindrical combustion chamber. The opposite end of the combustion chamber is the filling side for the propellant charge and is the side of the combustion chamber or of the entire generator that is closed, specifically by welding, after the filling process.

The biasing unit is inserted into the combustion chamber specifically through the filling-side axial end and contacts the combustion chamber laterally in a stable manner, so that the motion of the biasing unit can only take place in one direction.

The biasing unit is accommodated in the combustion chamber in an unsecured manner, as is provided by one embodiment, i.e., a form-fitting connection between the combustion chamber wall and the biasing unit is not necessary. Rather, the biasing unit is clamped between one axial end of the combustion chamber wall and the propellant charge.

The present invention is not limited to pure pyrotechnic gas generators. The preferred embodiment even provides an elongated hybrid gas generator, in which the combustion chamber is surrounded by a gas-filled pressure chamber.

DETAILED DESCRIPTION OF PREFERRED EMBODIMENTS

Figure 1:
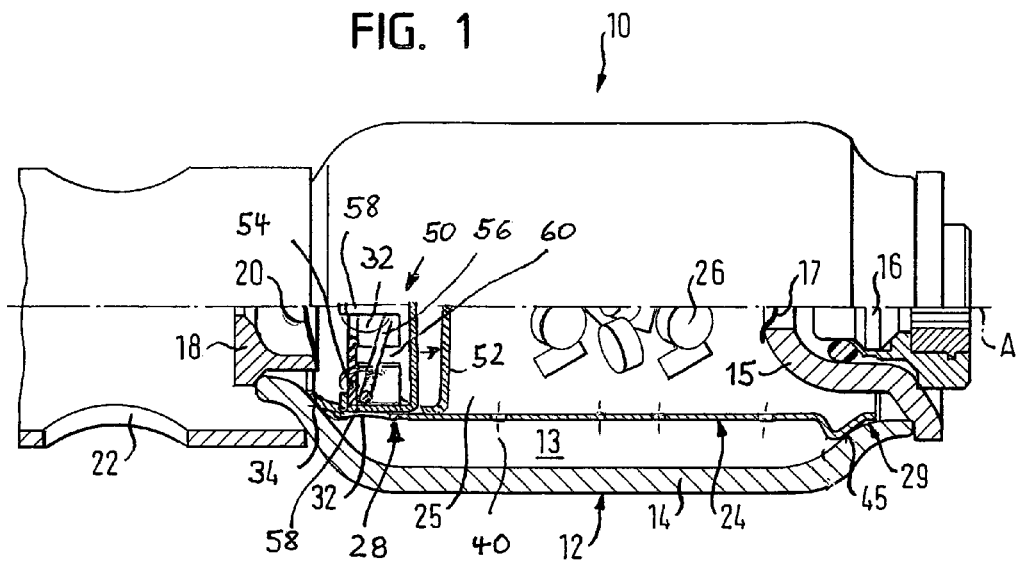
FIG. 1 depicts a schematic partial sectional view of a gas generator according to the present invention.

In FIG. 1, a hybrid gas generator 10 is shown, having an elongated, cylindrical external housing 12, which surrounds a pressure chamber, which is filled with a medium 13 that is under pressure, e.g., an inert gas such as argon or helium. Exterior housing 12 has an elongated shape and has a circumferential wall 14, which in the axial direction A tapers to a cone at both ends of gas generator 10.

Located at an axial filling end of gas generator 10 is a pot-shaped cover 15 and an ignition unit 16 that is connected to it, the ignition unit being known from conventional hybrid gas generators. In the example depicted here, ignition unit 16 is closed off from the pressure chamber by a diaphragm 17, which is destroyed when ignition unit 16 is activated. At the opposite axial end of gas generator 10, discharge openings 22 as well as a choke device 18 and a closure diaphragm 20 are provided. After closure diaphragm 20 is opened, the pressure chamber is in fluid communication with discharge openings 22 through choke device 18, so that gas can escape from gas generator 10.

In the interior of exterior housing 12, an elongated combustion chamber wall 24 is received like an insert in which combustion chamber 25 is configured, which is filled with a propellant charge 26 in tablet form. Propellant charge 26 is exclusively accommodated in combustion chamber 25. A first axial end 28 of combustion chamber 25 borders on choke device 18, whereas a second axial end 29 of combustion chamber 25, also known as the filling end, is located on the side of ignition unit 16.

Combustion chamber wall 24 is manufactured from a perforated plate and radially delimits the combustion chamber to the outside. Combustion chamber wall 24 at first end 28 has large through openings 32, and at first end 28 terminates in a chamfer 34 which has the shape of a truncated cone. Distributed over its entire circumference, tubular combustion chamber wall 24 has additional smaller openings 40.

At second end 29, a chamfer 45 is also provided, by which combustion chamber wall 24 is supported on circumferential wall 14, which in this area tapers conically. By chamfers 34, 45, combustion chamber wall 24 is fixed in position in exterior housing 12 both radially and axially.

In the area of end 28, there is a biasing unit 50 in combustion chamber 25, assuring that propellant charge 26 is biased.

Figure 2:
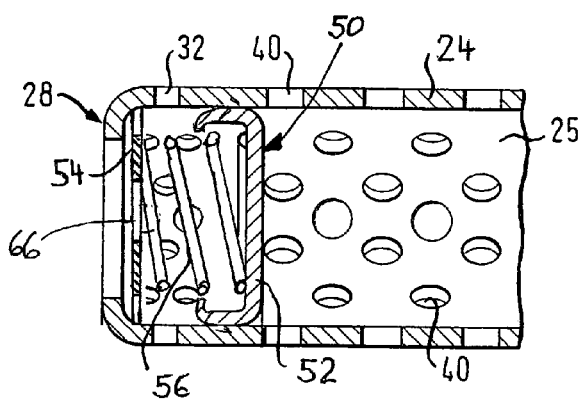
FIG. 2 depicts a somewhat modified embodiment of the combustion chamber insert shown in FIG. 1, having an integrated biasing unit.

Biasing unit 50 is made up of three parts, as can be discerned more easily in FIG. 2, i.e., a front wall 52, which is depicted in FIG. 1 in two positions, an annular rear wall 54 that is provided with a large through opening, and a symbolically depicted spring 56, that is arranged between walls 52, 54, the spring urging both walls 52, 54 away from each other axially. Front wall 52 is configured so as to be crown-shaped and on its outer edge has integrally-formed finger-shaped extensions that point toward rear wall 54. Specifically, four longer extensions 58 are distributed over the circumference, which, in one position (compressed position), engage behind rear wall 54, as well as, between longer extensions 58, short extensions 60, that in contrast to the former are not bent at the free end and that, on the front-side free end, contact rear wall 54, in the so-called compressed position of biasing unit 50.

Figure 3:
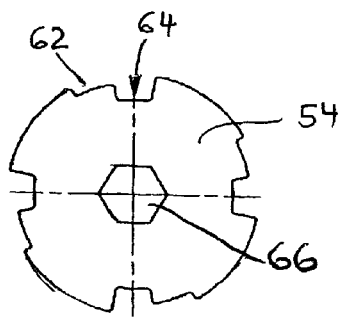
FIG. 3 depicts a top view of the rear wall of the biasing unit used in the present invention.

Biasing unit 50 is a self-contained, preassembled unit, extensions 58, 60 constituting a holding device between the two walls 52, 54 and being part of a bayonet lock, i.e., generally a turning lock. The bent, longer extensions 58 in fact extend through recesses 62 that are provided in segments on the exterior edge of rear wall 54 (see FIG. 3), the recesses enlarging radially to the inside forming insertion recesses 64.

Biasing unit 50 is preassembled in the following way. Spring 56 is inserted into pot-shaped front wall 52. Then, starting from the rear side, rear wall 54 is placed in position, long extensions 58 being aligned with recesses 64, so that rear wall 54 can be pressed near to front wall 52 in opposition to the spring force and then can be turned like a bayonet lock, extensions 58 thus finally being situated in the areas of recesses 62. In this state, biasing unit 50 is a self-contained unit having a compressed spring contained therein, front and rear walls 52, 54 being held in position at a fixed distance.

To make it easier to turn front wall 52 and rear wall 54 in relation to each other, through opening 66 in rear wall 54 is designed so as to be hexagonal. Alternatively, of course, this through opening 66 could be designed so as to be larger and, instead of this, a depression or recess could be configured in front wall 52 for inserting a tool.

In this compressed position, biasing unit 50 is pushed from axial end 29 into combustion chamber 25, the outside diameter of walls 52, 54, being proportioned in relation to the inside diameter of combustion chamber wall 24 so as to be virtually without play. Then the inwards-pointing, hook-shaped ends of long extensions 58 contact a shoulder in the area of chamfer 34 (left-hand position of the front wall 52 in FIG. 1). This inserting of biasing unit 50 is accomplished when the gas generator is upright, with end 29 pointing upwards. Subsequently, propellant charge 26 is filled in, combustion chamber 25 being not completely filled. Then the unit made up of cover 15 and ignition unit 16 is placed from above onto the not yet closed opening in the exterior housing. Finally, circumferential wall 14 and cover 15 are welded, with the gas generator still in the upright position. Due to the compressed, compact biasing unit, there is so much additional volume in combustion chamber 25 available for propellant charge 26, that the latter does not come into contact with cover 15 during the welding process, so that a gap exists between the propellant charge volume and cover 15.

After the welding, rear wall 54 is rotated via the left, still open side using a hexagonal tool, so that extensions 58 can leave recesses 64, and front wall 52 presses axially against the propellant in the direction of the arrow in FIG. 1 and is uncoupled from rear wall 54. The right-hand position of front wall 52 indicated in FIG. 1, resulting thereby, is the so-called release position, in which biasing unit 50 exerts a biasing force on propellant charge 26, which in this context moves to the right and is clamped between cover 15 and front wall 52.

Subsequently, gas generator 10 is filled with pressurized gas via the left, open front side and finally is closed using the unit that is made up of choke device 18 and closure diaphragm 20. This closing is preferably likewise accomplished by welding.

In the embodiment according to FIG. 2, only first end 28 is somewhat differently configured. Biasing unit 50 is depicted in the release position, and for purposes of clarity propellant charge 26 is omitted.

The invention claimed is:

1. A gas generator comprising:
   a combustion chamber (25) containing a pyrotechnic propellant charge (26) and
   a biasing unit (50) permanently arranged in the combustion chamber (25) biasing said propellant charge (26)

and comprising a holding device, the holding device holding said biasing unit (50) in a predetermined, fixed, compressed position, and selectively releasing said biasing unit (50) in a release position in which the biasing unit (50) exerts a biasing force on said propellant charge (26).

2. The gas generator as recited in claim 1, wherein said holding device has a mechanical locking means.

3. The gas generator as recited in claim 1, wherein said biasing unit (50) constitutes a self-contained unit, which holds itself in said compressed position.

4. The gas generator as recited in claim 1, wherein said biasing unit (50) is a preassembled unit.

5. The gas generator as recited in claim 1, wherein said holding device has a front wall (52) and extensions (58, 60) that protrude from said front wall (52).

6. The gas generator as recited in claim 5, wherein said extensions (58) engage a rear wall (54) of the biasing unit (50).

7. The gas generator as recited in claim 1, wherein said holding device includes a turning lock, in particular a bayonet lock, and attains said release position by turning said lock.

8. The gas generator as recited in claim 1, wherein said biasing unit (50) is situated at an axial end (28) of said combustion chamber (25).

9. The gas generator as recited in claim 1, wherein said biasing unit (50) is inserted into said combustion chamber (25) via an axial end (29) and laterally contacts a combustion chamber wall (24).

10. The gas generator as recited in claim 1, wherein said biasing unit (50) is accommodated in said combustion chamber (25) as a unit in unsecured fashion facing said propellant charge (26).

11. The gas generator as recited in claim 1, wherein it is an elongated hybrid gas generator.

12. The gas generator as recited in claim 11, wherein said combustion chamber (25) is surrounded by a gas-filled pressure chamber.

13. The gas generator as recited in claim 1, wherein said gas generator has a filling end for said propellant charge (26), said filling end being closed by a cover (15), and a quantity of said propellant charge (26) placed in said combustion chamber (25) and a volume differential of said combustion chamber between said compressed position and said release position of said biasing unit (50) is so large that, when said filling end is pointing upwards and said biasing unit (50) is in said compressed position, said cover (15) in its closed position is spaced away from said propellant charge (26), whereas in said release position said propellant charge (26) presses against said cover (15).

14. A gas generator comprising:
a combustion chamber (25) containing a pyrotechnic propellant charge (26), and
a biasing unit (50) for biasing said propellant charge (26), said biasing unit comprising a holding device for holding said biasing unit (50) in a predetermined, fixed, compressed position, and selectively releasing said biasing unit (50) to a release position in which the biasing unit (50) exerts a biasing force on said propellant charge (26), said biasing unit having a front wall (52) facing said propellant charge (26), a rear wall (54) facing away from said propellant charge (26), and an elastic spring element (56) situated between said front wall (52) and said rear wall (54).

15. The gas generator as recited in claim 14, wherein said front wall and said rear wall (52, 54) are alternatively joined to each other by said holding device firmly and at a constant distance in said compressed position, or are uncoupled from each other in said release position.

16. A gas generator comprising:
a combustion chamber (25) containing a pyrotechnic propellant charge (26), and
a self-contained biasing unit (50) permanently arranged in the combustion chamber (25), said biasing unit comprising a holding device for holding said biasing unit (50) in a predetermined, fixed, compressed position, and selectively releasing said biasing unit (50) to a release position in which the biasing unit (50) exerts a biasing force on said propellant charge (26).

17. The gas generator as recited in claim 16, wherein said biasing unit comprises a front wall (52) facing said propellant charge (26), a rear wall (54) facing away from said propellant charge (26), and an elastic spring element (56) situated between said front wall (52) and said rear wall (54).

18. The gas generator as recited in claim 17, wherein said front wall (52) and said rear wall (54) are joined to each other by said holding device firmly and at a constant distance in said compressed position, and are uncoupled from each other in said release position.

19. The gas generator as recited in claim 17, wherein said holding device comprises extensions (58, 60) that protrude from said front wall (52).

20. The gas generator as recited in claim 19, wherein said extensions (58) engage said a rear wall (54) of the biasing unit (50).

\* \* \* \* \*